United States Patent [19]

Stroup

[11] Patent Number: 4,552,047

[45] Date of Patent: Nov. 12, 1985

[54] APPARATUS FOR CUTTING TUBING INTO PREDETERMINED LENGTHS

[76] Inventor: Steven L. Stroup, 602 W. Washington, Bluffton, Ind. 46714

[21] Appl. No.: 512,789

[22] Filed: Jul. 11, 1983

Related U.S. Application Data

[62] Division of Ser. No. 191,319, Sep. 26, 1980, Pat. No. 4,411,179.

[51] Int. Cl.$^4$ ............................................. B23B 5/14
[52] U.S. Cl. ........................................ 82/102; 82/20
[58] Field of Search ...................... 82/102, 20; 279/4

[56] References Cited

U.S. PATENT DOCUMENTS

| | | | |
|---|---|---|---|
| 2,389,556 | 11/1945 | Siegerist | 82/20 |
| 3,493,238 | 2/1970 | Ludwig | 279/4 |
| 3,528,327 | 9/1970 | Lindemann | 82/20 |

FOREIGN PATENT DOCUMENTS 2725746  12/1978  Fed. Rep. of Germany ........ 82/102

Primary Examiner—Leonidas Vlachos
Attorney, Agent, or Firm—George A. Gust

[57] ABSTRACT

An apparatus for cutting metallic tubing into predetermined lengths has a stationary supporting frame on which is mounted a feeding mechanism for moving a straight length of tubing unidirectionally intermittently along a straight path in alignment with the longitudinal axis of the tubing. A cutoff device driven by a motor having a hollow shaft for receiving the tubing is also mounted on the frame. The feeding mechanism is in two sections each being individually reciprocable but controlled to operate oppositely and alternately to feed tubing in predetermined lengths to the cutoff device. The cutoff device is operated to cut off the tubing while it is stationary between feeding movements of the feeding mechanism.

10 Claims, 28 Drawing Figures

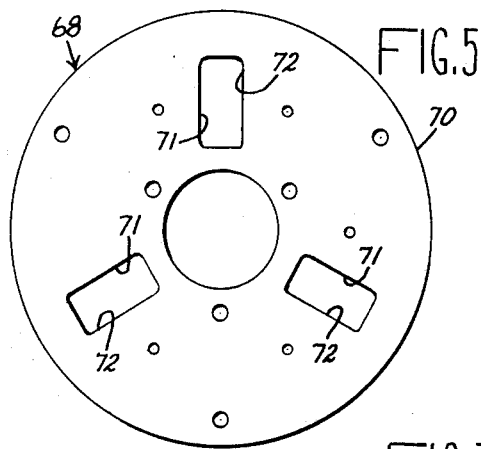
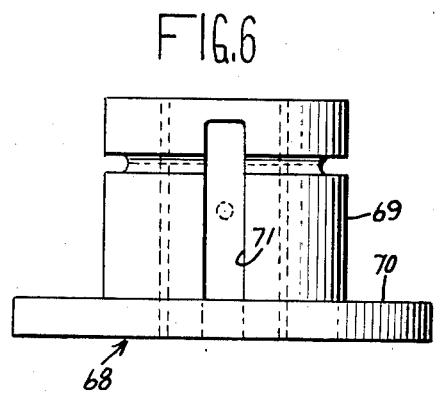
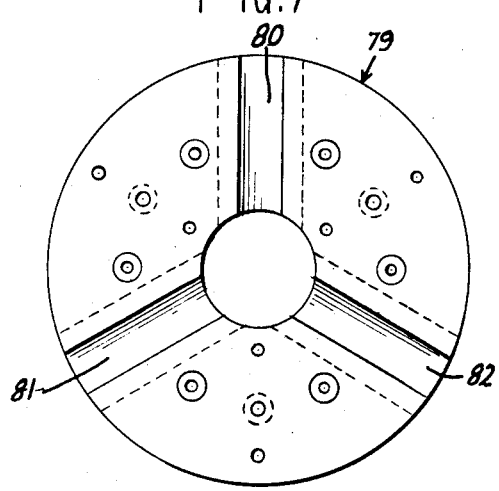
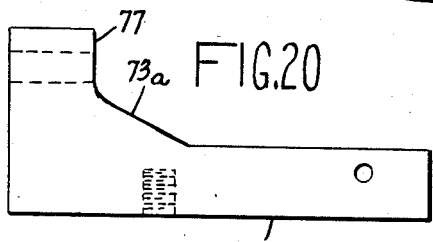
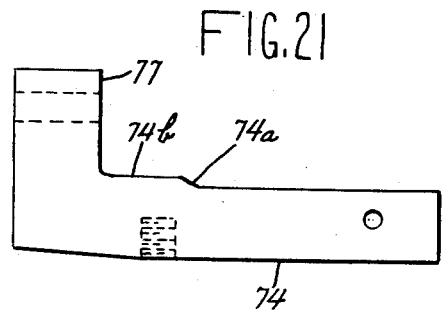

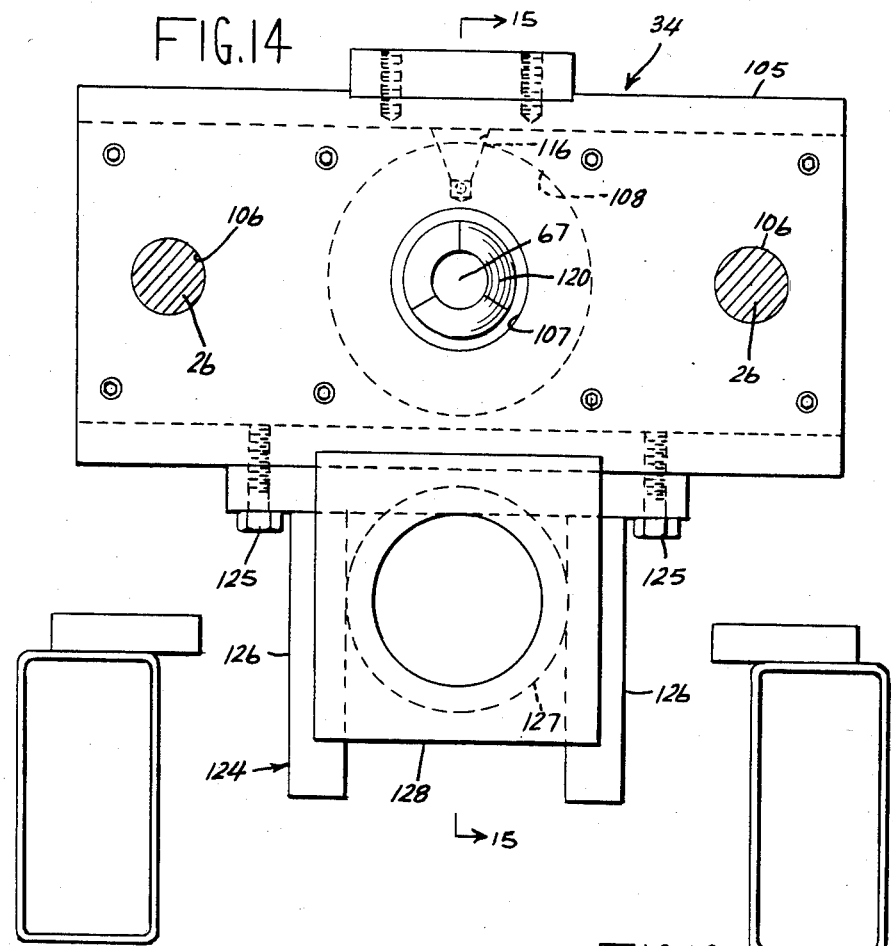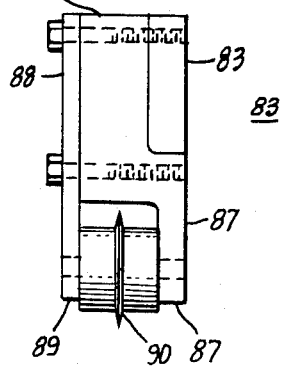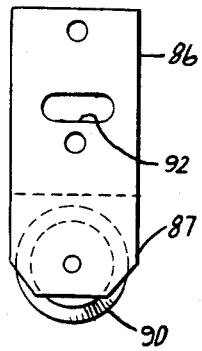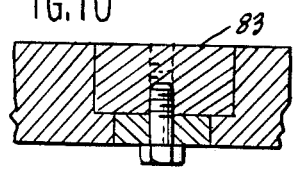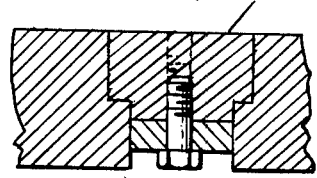

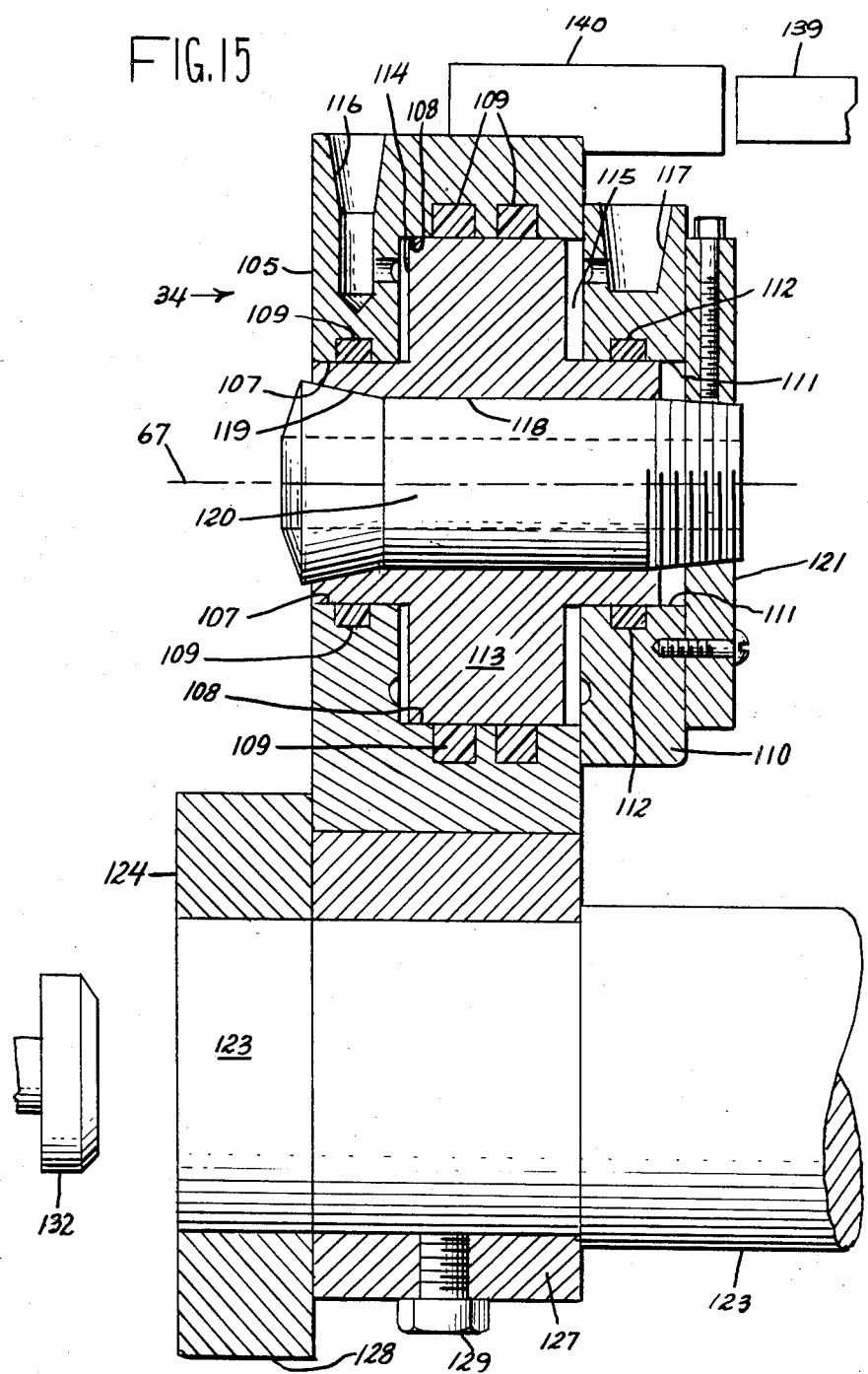

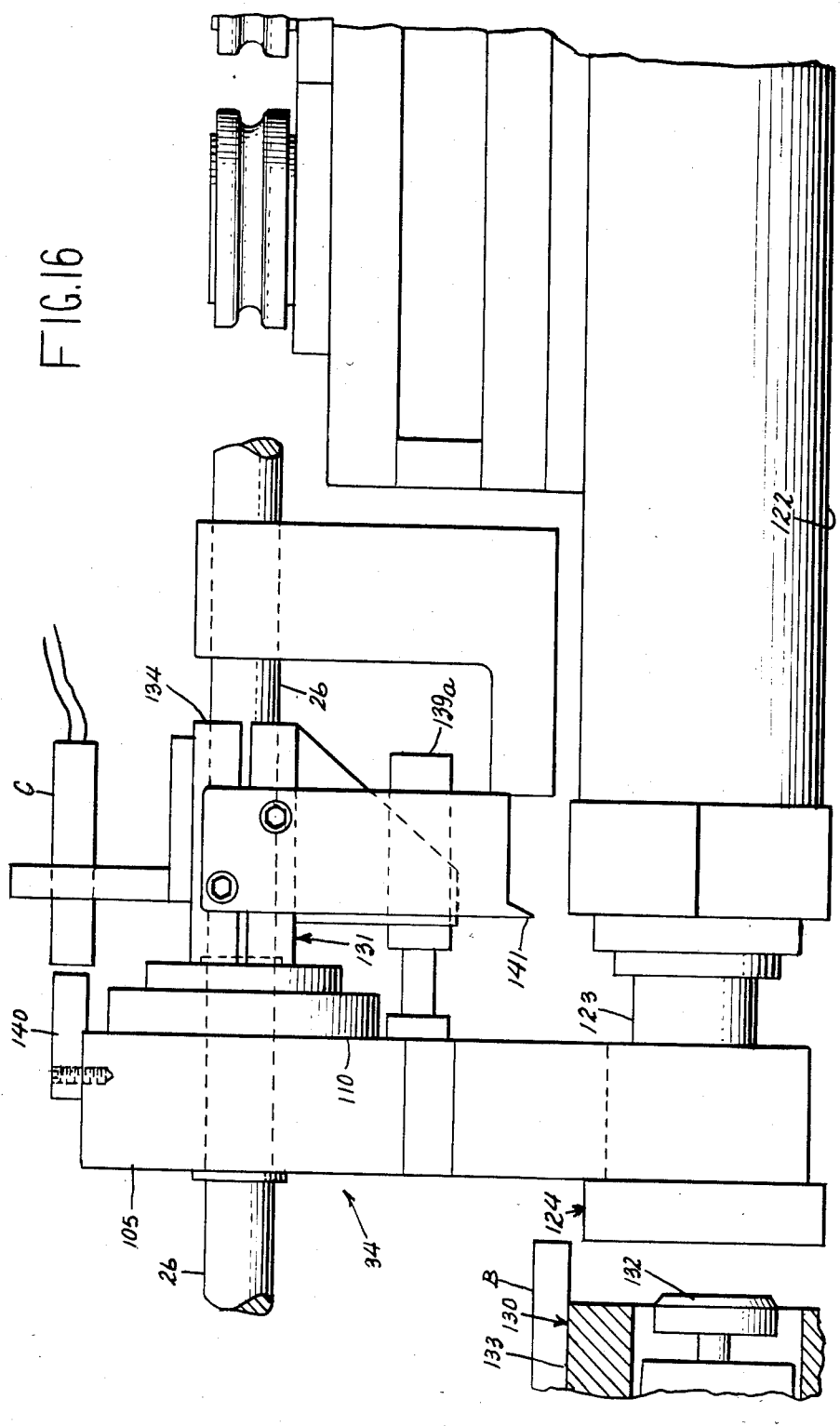

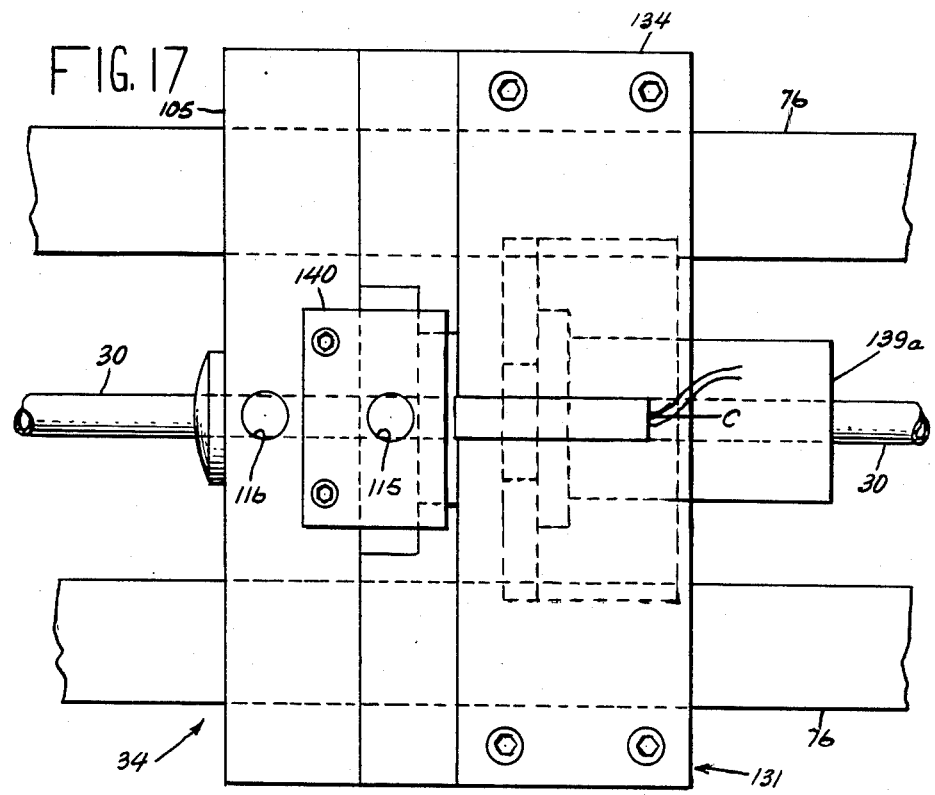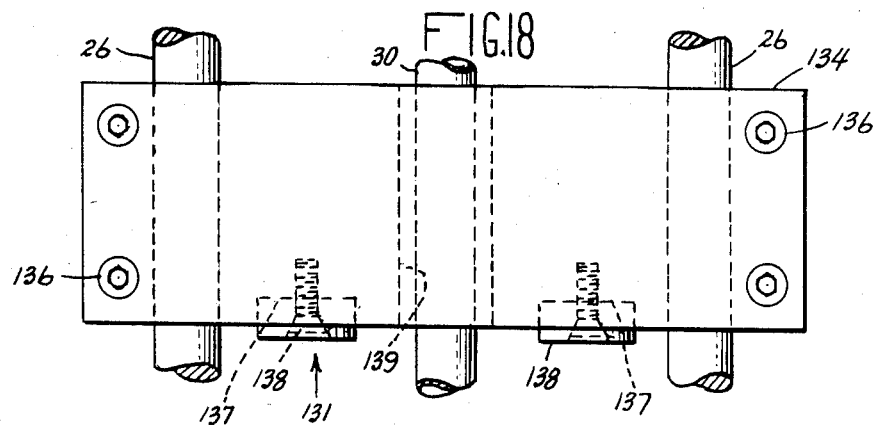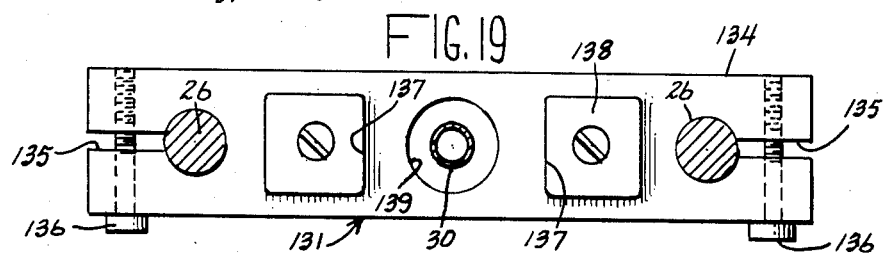

4,552,047

APPARATUS FOR CUTTING TUBING INTO PREDETERMINED LENGTHS

This is a divisional of application Ser. No. 191,319 filed Sept. 26, 1980 now U.S. Pat. No. 4,411,179, granted Oct. 25, 1983.

BACKGROUND OF THE INVENTION

1. Field of the Invention

The present invention relates to apparatus for cutting long lengths of tubing into shorter, predetermined lengths and more particularly to such an apparatus that operates at relatively high speed with the severed ends of the cut pieces being relatively burr free.

2. Description of the Prior Art

Prior apparatus for cutting tubing into predetermined lengths utilized a stationary supporting frame which included parallel, spaced apart guide bars having two devices mounted thereon, one for cutting through the tubing and the other for feeding the tubing in predetermined lengths to the cutoff device. The cutoff device was stationary while the single feeding device was movably mounted on the guide bars to reciprocate between limits, this device employing a spring released, two part clamping jaw operated by a power cylinder which when actuated engaged the clamp jaws with the tubing. A power cylinder on the frame then moved the feeding device forwardly carrying a length of tubing to the cutoff device.

The cutoff device employed a belt driven spindle through which the tubing passed, a motor offset to one side of the path of the tubing being connected to the spindle by means of a belt.

Upon completion of a cutting operation, the single feeding device released its grip on the tubing by means of a spring release and then retracted a predetermined distance at which time it was actuated to grip the tubing and feed it forwardly for another cutting operation. Repeated cycles thus resulted in cutting off predetermined lengths of tubing. Other prior art is disclosed in U.S. Pat. Nos. 2,473,559; 2,553,147; 2,562,879; 3,242,566; 3,276,301; 3,613,489; 3,651,569; 3,759,127; 3,772,945 and 3,808,928.

SUMMARY OF THE INVENTION

The present invention relates to an apparatus for cutting metallic tubing into predetermined lengths and includes a stationary supporting frame having a feeding mechanism thereon for moving a straight length of tubing unidirectionally intermittently along a straight path in alignment with the longitudinal axis of the tubing. A cutoff mechanism also carried by the frame severs the tubing while it is stationary between movements. The feeder mechanism includes two spaced apart feeding devices mounted for reciprocable movement on the frame. The feeding devices are reciprocated simultaneously in opposite directions between predetermined limits, each feeding device including a collet for gripping the tubing when the feeding device is moved in a forward direction and for releasing the tubing during movement of the device in the opposite direction. Both the feeding and cutoff mechanisms have central passages in coaxial alignment with a straight path followed by the tubing such that the mechanisms operate substantially coaxially and in line with the straight length of tubing being fed through the apparatus.

It is an object of this invention to provide an apparatus which is efficient and reliable in cutting tubing into predetermined lengths in a rapid manner requiring a minimum of time.

It is another object of this invention to provide a cutting apparatus which employs both feeding and cutoff mechanisms having centrally located passages therethrough which receive for manipulation a straight length of tubing to be cut off.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIGS. 5 and 6 are front and side views, respectively, of the cylindrical body used in the cutter mechanism of FIGS. 3 and 4;

FIG. 7 is an end view similar to FIG. 3 with the cutter and back-up roller slide assemblies removed;

FIGS. 8 and 9 are side and front views, respectively, of the sliding cutter assembly;

FIGS. 10 and 11 are fragmentary cross sections taken substantially along section line 10—10 and 11—11 of FIG. 3;

FIG. 14 is a left end view, as viewed in FIGS. 1 and 2, of one of the feeder mechanisms;

FIG. 15 is a sectional view taken substantially along section line 15—15 of FIG. 14;

FIG. 16 is a side view of the feeder mechanism;

FIG. 17 is a top view thereof;

FIGS. 18 and 19 are top and end views, respectively, of the rear stop bar;

FIG. 20 is a side view of the cutter actuating lever used in the cut-off mechanism of FIGS. 3 and 4;

FIG. 21 is a side view of the roller actuating arm of the cut-off mechanism;

DESCRIPTION OF THE PREFERRED EMBODIMENT

Figure 1:
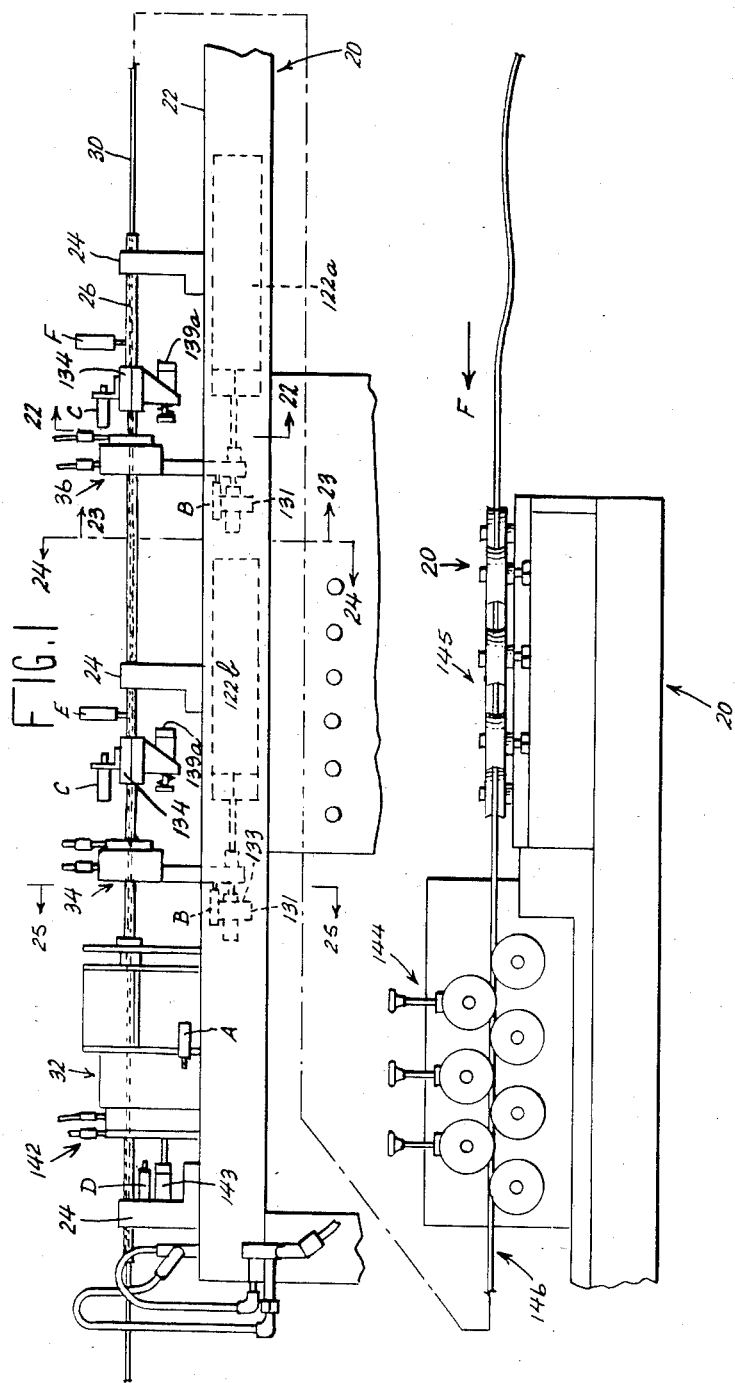
FIG. 1 is a side view, broken longitudinally into two parts, of a machine of this invention.
Figure 2:
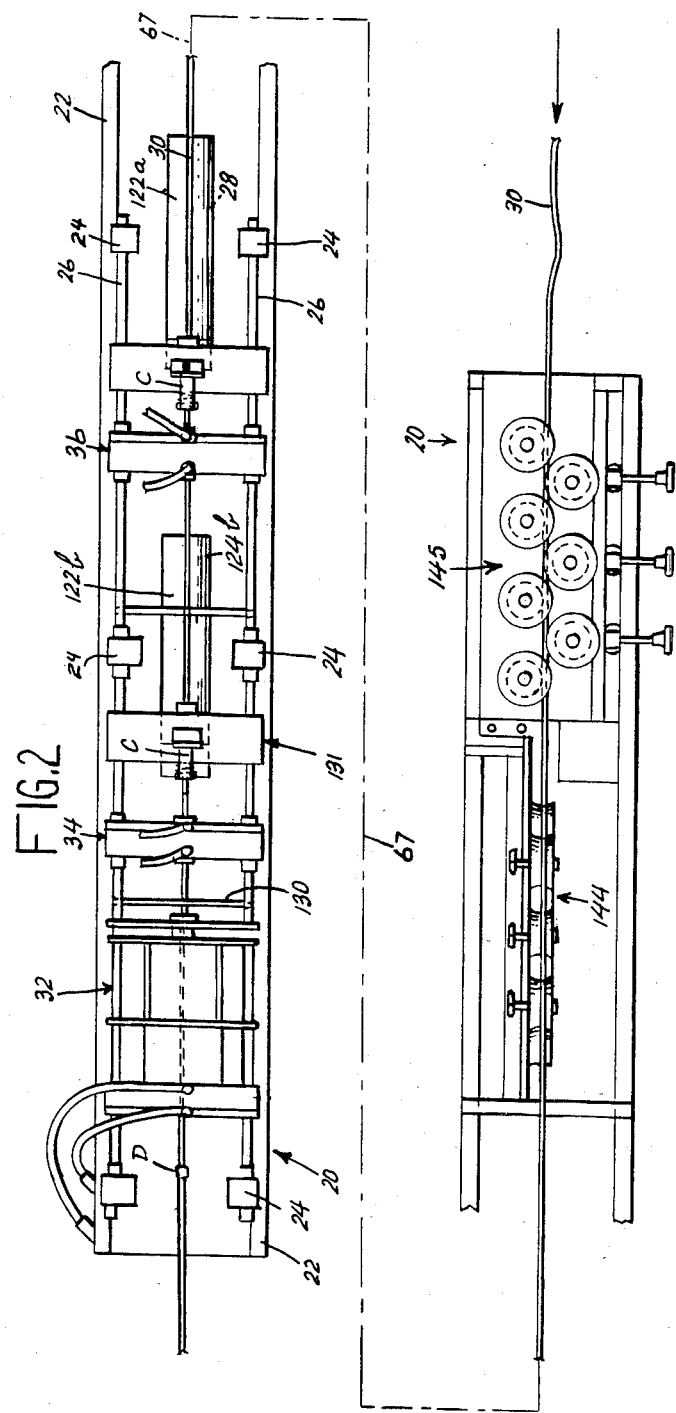
FIG. 2 is a similar top plan view thereof.

Referring to the drawings, and more particularly to FIGS. 1 and 2, the machine of this invention includes a stationary frame 20 having two horizontal, spaced and parallel mounting beams 22. Six or more upstanding supports 24 are secured to the upper edges of the beams 22 and are provided with straight, aligned bores for receiving therethrough two parallel, spaced guide bars 26, these guide bars 26 being secured to the supports 24 by some suitable means such as setscrews (not shown). A cutter or cutoff mechanism indicated generally by the numeral 32 mounted on the frame 20 serves in cutting off tubing 30, such as copper, threaded through the machine. Two feeders or feeding mechanisms 34 and 36 mounted for sliding movement on the guide bars 26 are employed for the purpose of feeding predetermined lengths of tubing intermittently and successively to the cutoff mechanism 32 to provide a measured length of tubing to be cutoff. Simply stated, the straight length of tubing 30 is threaded through the feeding mechanisms 34 and 36 and the cutoff mechanism 32, is gripped by either or both of the feeding mechanisms 34 and 36 which are moved forwardly or to the left, as viewed in FIG. 1, a fixed distance carrying therewith the tubing 30, following which the cutoff mechanism 32 is actuated for severing the tubing. This cycle is repeated thereby providing cut pieces of tubing of common length.

CUTOFF MECHANISM

Figure 3:
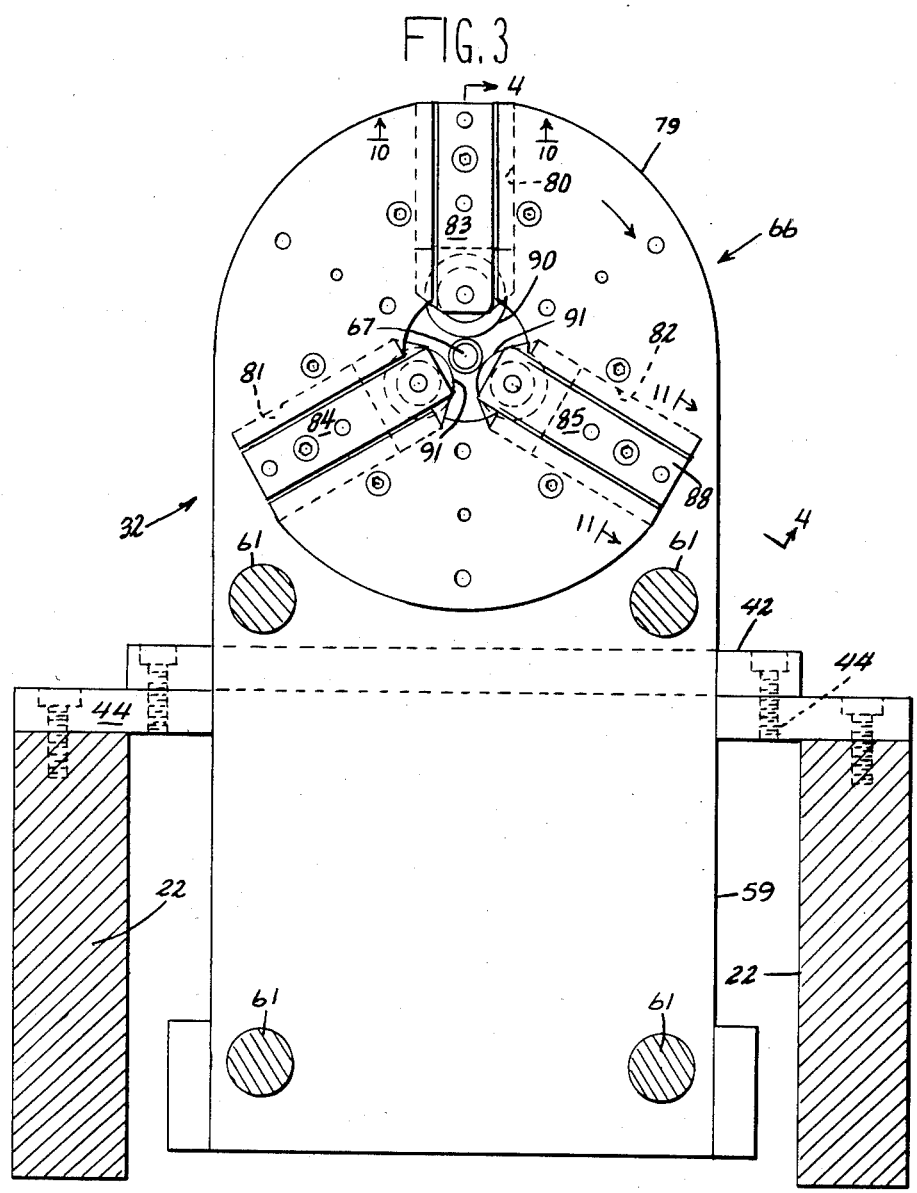
FIG. 3 is a left end view of the cutter mechanism as shown in FIGS. 1 and 2.
Figure 4:
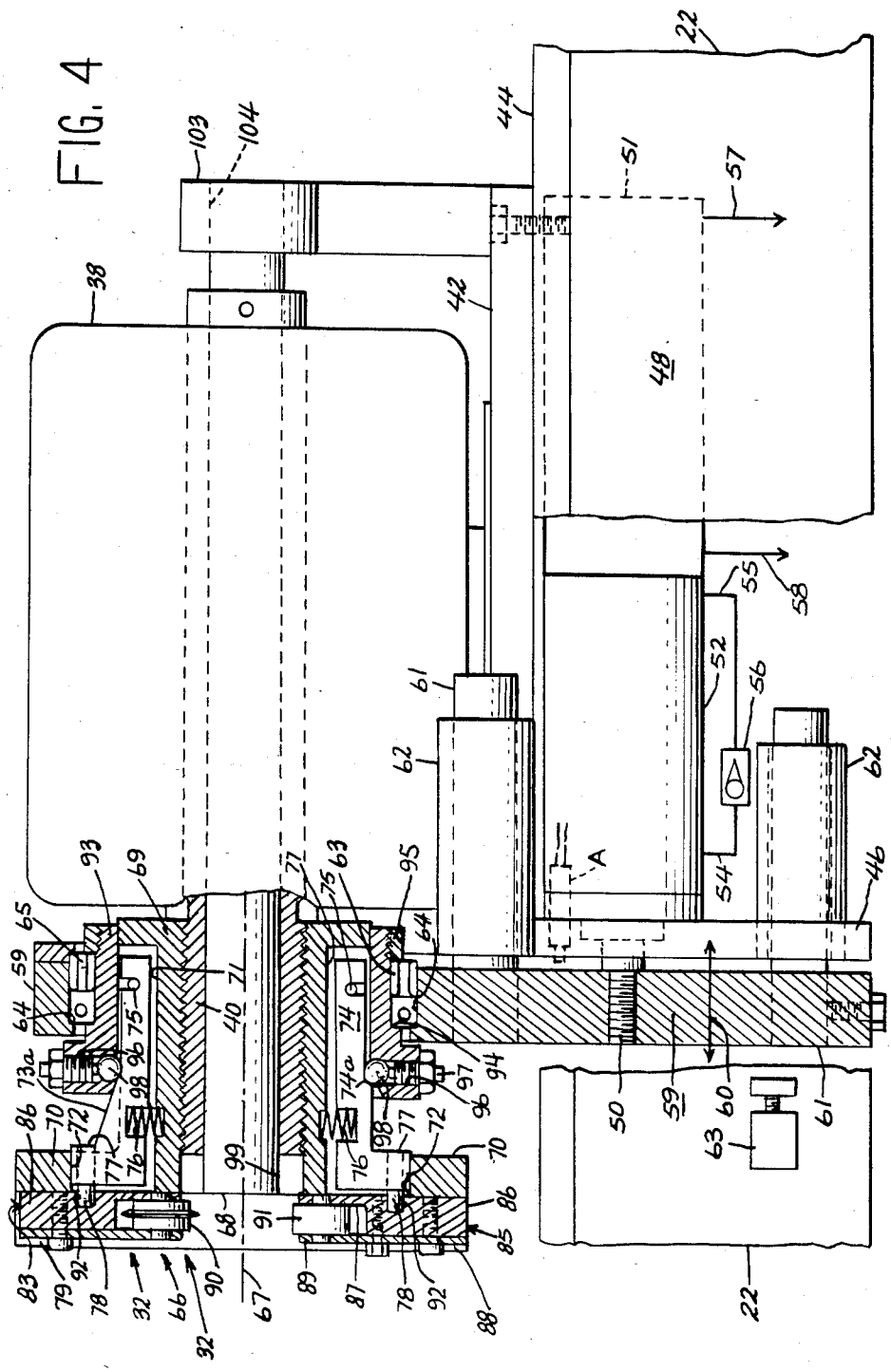
FIG. 4 is a side view of the cutter mechanism partly sectioned on section line 4—4 of FIG. 3 for clarity of illustration.

Referring to FIGS. 3 and 4, the cutoff mechanism 32 comprises an electric motor 38 provided with a hollow shaft 40 which receives therethrough the tubing 30. The motor 38 is mounted on a flat, horizontal plate 42 which is secured at the opposite edges to the two rails 22 by means of two strip plates 44. Another mounting plate 46 which is vertically arranged is secured at its upper end to the left end of the motor mounting plate 42 (as viewed in FIG. 4). Secured to the supporting plate 46 is a combination air-hydraulic cylinder generally indicated by the numeral 48, the single piston rod 50 thereof projecting from the left end through a clearance opening in the plate 46. The cylinder 48 is in two sections 51 and 52, section 51 being air operated and section 52 being hydraulic. Both sections 51 and 52 have reciprocable pistons which are connected to common piston rod 50. The air cylinder section 51 is double acting having inlet and exhaust ports 57, 58 at the opposite ends thereof, and the hydraulic section 52 is also double acting having conventionally arranged inlet and exhaust ports at its opposite ends as indicated by the numerals 54 and 55. No external connections are made to the ports 54 and 55 of hydraulic section 52, instead a hydraulic line connects between the two ports 54 and 55 having a manually adjustable flow control valve 56 of conventional design in series therewith. Adjustment of this valve 56 determines the speed at which the piston in the hydraulic cylinder section 52 may be advanced forwardly (toward the left as viewed in FIG. 4). It may now be stated that by connecting the port 57 of air cylinder section 51 to a source of air under pressure and the port 58 to exhaust, the piston in the section 51 will be driven toward the left carrying with it the piston in the hydraulic section 52. Hydraulic fluid ahead of the piston in the section 52 will be metered through the flow control valve 56 and the port 55 into the chamber at the rear of the piston, this metered flow resisting the forward movement of the piston. By this means, adjustment of the valve 56 can control the speed at which the piston rod 50 is advanced forwardly toward the left. The flow control valve 56 is so constructed that it provides full flow for the return stroke of the two pistons thereby providing for rapid retraction.

To the front of the supporting plate 46 (one on the left as viewed in FIG. 4) is disposed a flat upright, movable actuator plate 59 which is carried by the supporting frame 46 for horizontal reciprocable movement in the direction of the double ended arrow 60. This plate 59 is supported on the plate 46 by means of four guide pins 61 secured at the left ends to the plate 59 by some suitable means such as setscrews and slidably received in bushings 62 secured to the plate 46. The piston rod 50 is also secured to the actuator plate 59. Operation of the air-hydraulic cylinder 48 thus moves the piston rod 50 in the direction of the double ended arrow 60 causing corresponding movement of the actuator plate 59, the guide pins 61 and bushings 62 accommodating this movement. The distance of leftward or forward movement of the actuator plate 59 is positively limited by means of an adjustable stop 63 suitably secured to the frame members 22 just ahead of the actuator plate 59 as shown (FIG. 4). Forward movement of the actuator plate 59 thus limited by the positive stop 63, as explained in more detail later, limits the depth of the cut through the tubing 30 to just short of complete severance.

The actuator plate 59 is provided with an enlarged, bearing retainer opening 64 which receives a bearing 65 that mounts a rotatable cutting head assembly indicated generally by the numeral 66. The cutting head assembly 66 is rotatable about the axis 67 of the motor shaft 40 and the tubing 30.

The cutting head assembly 66 includes a cylindrical body 68 having a hub portion 69 provided on the left end with a radial disc-like flange 70 (FIGS. 5 and 6). As shown in FIG. 4, the body 68 is threadedly connected to the end of the motor shaft 40 so as to be rotatable in unison therewith.

The hub 69 is provided with three elongated, axially extending recesses 71 equally angularly spaced apart as clearly shown in FIG. 5. In the flange 70 is provided three rectangular openings 72, these openings being in registry with the lefthand ends of the recesses 71.

Mounted in the recesses 71 are elongated lever elements 73 and 74, respectively, (FIGS. 20, 21) there being one lever element 73 in one of the recesses 71 and one each of the lever elements 74 in the other two recesses 71, respectively. The lever elements 73 and 74 are identically constructed except for ramp or camming surfaces which will be described. Generally, the righthand ends of lever elements 73 and 74 are pivotally connected to the hub 69 by means of pivot pins 75, the lefthand ends being biased radially outwardly by means of compression springs 76. The lefthand ends of the lever elements have arm portions 77 which extend outwardly at right angles and which further fit with moving clearance into the rectangular openings 72 in the body flange 70. In each of the arm portions 77 is press fitted a guide pin 78 which extends forwardly of the front face of the body flange 70.

The lever elements 73 and 74 are identically constructed except for a ramp on each which extends from the outer surface of the lever element to the arm portion 77, this ramp being indicated by the numeral 73a for the lever element 73 and 74a for the lever elements 74. These ramps 73a and 74a are at the same angle of inclination with respect to the longitudinal axis of the lever elements, a typical angle being fifteen degrees. However, while the ramp 73a extends the full distance from the upper surface of the lever element 73 to the arm portion 77, the ramp 74a extends only part way with the remainder 74b being truncated or otherwise formed parallel to the longitudinal axis of the lever element 74. The reason for this difference in the shapes of the ramps 73a and 74a will be explained in detail later.

Mounted on the front face of the flange 70 is a segmented gib plate 79, this plate 79 being composed of three arcuate segments as shown in FIG. 7. The segments are spaced apart to provide three radial guideways 80, 81 and 82 on one hundred twenty degree centers in registry with the three openings 72 in the body flange 70. Three slide assemblies 83, 84 and 85 are slidably received by the respective guideways 80, 81 and 82 as shown, these assemblies being shown in somewhat more detail in FIGS. 8 to 11. Since these assemblies 83, 84 and 85 are essentially of the same design, a description of one will suffice for all three. Each slide assembly includes a rectangular block 86 that is formed on one side with an end flange 87. Secured to the face of the block 86 is a flat, rectangular plate 88 by means of threaded fasteners which is extended far enough to provide another end flange 89 juxtaposed but spaced from end flange 87. For the slide assembly 87 (FIG. 8) a circular knife-like cutter 90 is journaled for rotation in the end flanges 87 and 89. For the slide assemblies 84 and 85, rollers 91 are journaled between the end flanges 87 and 89, these serving a purpose to be explained later.

The blocks 86 of the three slide assemblies are each provided with an elongated cavity 92 which receives the distal end of the respective actuator pin 78. Thus, as the respective levers 73 and 74 are pivoted within the respective recesses 71 of the hub 69, the slide assemblies 83, 84 and 85 are correspondingly moved in the guideways 80, 81 and 82 radially of the body 68.

Actuation of the lever elements 73 and 74 and the respective slide assemblies 83, 84 and 85 is produced by the reciprocating movement of the actuator plate 59. This is effected by means of an actuating sleeve 93 which surrounds the hub 69 and is rotatably supported within the hearing 65. The sleeve 93 is keyed to the hub 69 for rotation therewith but is slidable axially thereon. Specifically, the sleeve is provided with a bearing retainer groove 94 which with the retainer groove 64 in the actuator plate 59 provides an annular recess for the bearing 65. An internally threaded retainer ring 95 is threaded over the end of the sleeve 93 to bear against the bearing 65. The sleeve 93 is thus rotationally secured to the actuator plate 59 for reciprocating movement therewith.

In the left end of the sleeve 93 is provided three threaded radial bores 96, each of these receiving a set screw 97 which bears against a stainless steel ball 98. The ball 98 in turn bears against the respective lever elements 73, 74 in the region of the respective ramp portion 73a, 74a. The left end of the bore of sleeve 93 is tapered to clear the ramp portions.

Viewing FIG. 4, the actuator plate 59 and the cutting head assembly 66 are shown fully retracted; i.e. the actuator plate 59 has been moved against the plate 46, its reverse stop, which positions the sleeve 93 such that the lever elements 73 and 74 are pivoted radially outwardly by the springs 76 thereby to fully retract radially the cutting and backup slide assemblies 83, 84 and 85. In this position, the balls 98 in the actuating sleeve 93 are disposed at the bottom of the respective ramps 73a, 74a as shown.

Upon initial actuating movement of the plate 59 toward the left (FIG. 4), the sleeve 93 is moved leftward causing the camming balls 98 to start riding up the respective ramps 73a, 74a. This causes the respective lever elements 73, 74 to pivot radially inwardly about the pivot axes 75 thereby forcing the left ends of the lever elements radially inwardly which carries with them the respective slide assemblies 83, 84 and 85.

As the leftward movement of the actuator plate 59 continues, eventually the camming balls 98 on the lever elements 74 will reach the crest of the respective ramps 74a. Continued leftward movement causes the balls 98 to ride onto the truncated surfaces 74b which causes no further depression or inward movement of the lever elements 74. To the contrary, however, since the ramp 73a on the lever element 73 is not truncated, this continued leftward movement of the sleeve 93 and the camming ball 98 continues to depress or pivot the lever element 73 inwardly which carries the cutter slide 83 radially inwardly.

Figure 12:
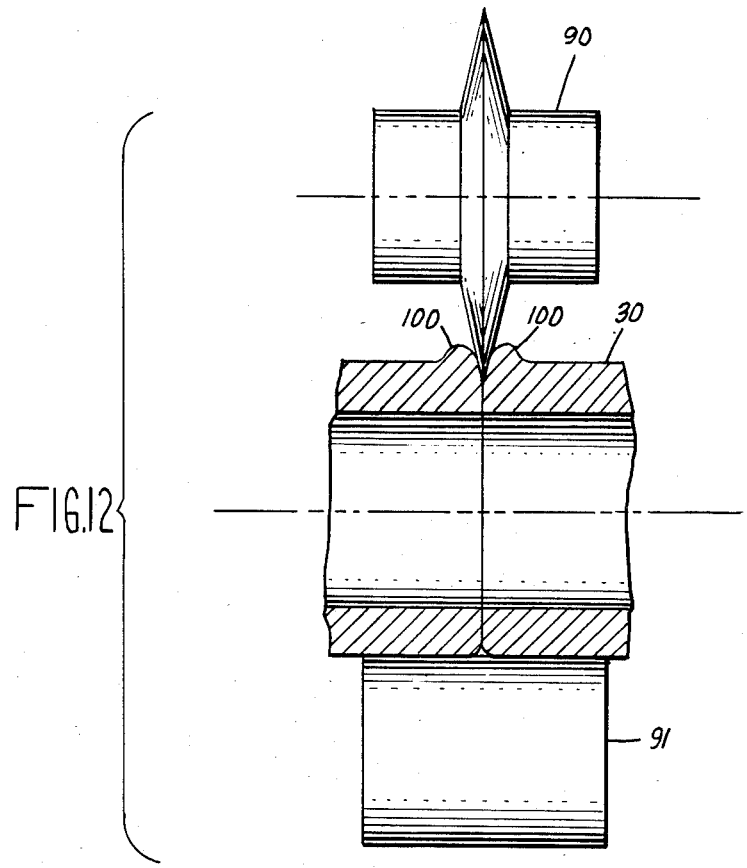
FIGS. 12 and 13 are illustrations, partly sectioned, of the cutter in operation and are used in explaining the operation of this invention.
Figure 13:
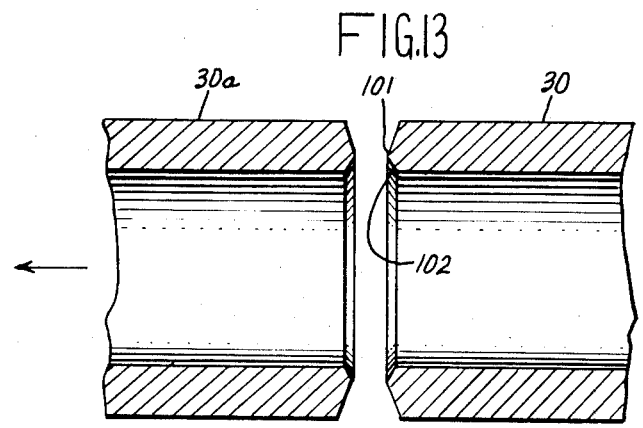
Figure 22:
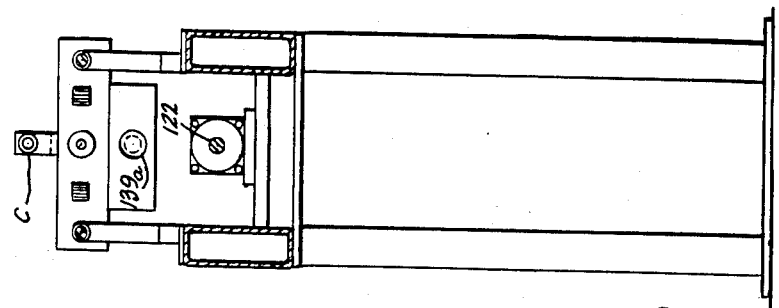
FIG. 22 is a cross section taken substantially along section line 22—22 of FIG. 1.
Figure 23:
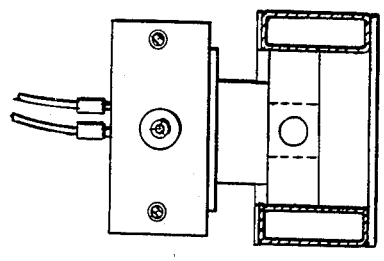
FIG. 23 is a cross section taken substantially along section line 23—23 of FIG. 1.
Figure 24:
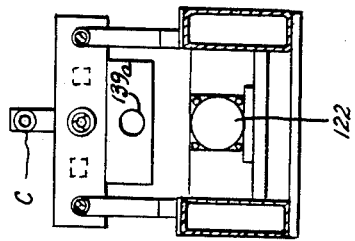
FIG. 24 is a cross section taken substantially along section line 24—24 of FIG. 1.

Recapitulating, then, and examining FIG. 3 in particular, the first portion of the leftward movement of the actuator plate 59 results in all three of the slide assemblies 83, 84 and 85 moving radially inwardly by equal amounts toward the axis 67 of the cutting head assembly 66. When the plate 59 has moved a distance that transitions the camming balls 98 from the ramp portions 74a to the truncated portions 74b, the roller back-up slides 84 and 85 will no longer be moved radially inwardly, but the cutter slide 83 will be. When the actuator plate 59 has moved forwardly to the point of engagement with the stop 63, the cutter slide 83 will have moved radially inwardly the desired distance effectively to cut off a section of tubing disposed within the hollow shaft 40 of the motor 38 and the passage 99 of the cutting head assembly 66. The parts of the machine are so sized and adjusted that for tubing of a given diameter, the back-up rollers 91 of the slide assemblies 84 and 85 are moved inwardly a distance as will just engage the periphery of the tubing when its axis is coincident with the axis 67 of the cutoff mechanism. It is at this point that the camming balls 98 transition from the respective ramps 74a to the leveled off portions 74b. Rotation of the cutting head assembly 66 by means of the motor 38 while camming the cutter slide assembly 83 further radially inwardly causes the circular knife 90 to engage the tubing and to cut thereinto. The stop 63 is so adjusted that the knife 90 will not cut entirely through the wall of the tubing, but instead will stop short thereof. The speed of cutting movement is determined by the rate at which the combination air-hydraulic cylinder 48 is permitted to advance, this being controlled by the flow control valve 56. It may be generalized that the slower this advancement, the higher quality will be the cut through the tubing. A feed which is too rapid can result in producing a burr in the cut portion as well as excessive wear of the cutting knife 90. The cutoff action is graphically illustrated in FIGS. 12 and 13. In FIG. 12 the knife 90 is shown as penetrating into the tubing 30 (assumed to be soft copper) displacing metal laterally thereof causing the formation of ridges 100. By reason of the presence of the backup rollers 91, however, the ridges 100 are flattened such that the outside diameter of the cut portion of the tubing remains uniform with the remainder of the tubing. As will be explained in detail later, the section 30a of the tubing being cut off has a pulling force applied thereto such that when the knife 90 has penetrated to a depth through the wall of the tubing 30 just short of cutting all the way through, with the pulling force exceeding the tensile strength of the remaining wall thickness, the section 30a will be in effect torn or pulled away from the other tubing section. In FIG. 13 the depth of knife cut is indicated as penetrating to the point 101, the other section of the cut end that is torn being indicated by the numeral 102.

It may be explained at this time that for a tubing wall thickness of about thirty-thousandths inch, the knife 90 is caused to penetrate into the wall a distance of about twenty-six to twenty-seven thousandths. The adjustable stop 63 (FIG. 4) prevents the knife 90 from entering any more deeply. This is an important consideration in obtaining a good quality cut which leaves the tubing ends substantially free of any burrs.

Were it not for the presence of the stop 63 and the knife 90 were permitted to cut cleanly through the tubing wall, a burr would be formed radially inwardly of the tubing at the cut by reason of the wiping action of the knife 90. By stopping the cut just short of completely severing the tubing, and pulling the cut section away from the main portion, the formation of such an internal burr is prevented.

If the mechanical stop 63 were not present, and deactivation of the cylinder 48 was relied upon to stop the inward movement of knife 90, the moment the cut section 30a pulled away the knife 90 would surge or overshoot inwardly thereby wiping a burr into the interior of the cut end. The presence of the mechanical stop 63 in combination thus results in producing a quality cut.

Referring once again to FIG. 4, the rear end of the shaft 40 is rotatably supported within a shaft support 103 which is rigidly secured to the frame members 22. This support 103 is provided with an opening 104 in registry with the hollow shaft 40 and axis 67 for receiving the tubing 30 therethrough.

A proximity switch A (FIGS. 1 and 4) is mounted on plate 46 to sense the retracted position of plate 59, and is connected into the electrical control circuitry (to be later explained) for deactuating power cylinder 48. This cylinder 48 is actuated upon completion of cut off to retract plate 59 to the position shown in FIG. 4 thus readying the cut-off mechanism for performing another cut off operation.

FEEDER MECHANISM

This mechanism for feeding the tubing 30 to the cutter 32 in predetermined, incremental lengths is generally indicated by the numerals 34 and 36 which have been previously briefly described. Since the two mechanisms 34 and 36 are identically constructed, a description of one will suffice for both. Referring to FIGS. 14 through 17, a rectangular clamping support block 105 is provided with two spaced bores 106 which slidably receive the two guide rods 26, respectively. The block 105 is provided with a cylindrical cavity having two different diameter portions 107 and 108 concentric with axis 67, both being provided with ring seals 109. A backing plate 110 is secured to the rear side of the block 105 by means of threaded fasteners, and it too is provided with a coaxial bore 111 equal in diameter to the bore portion 107. A ring seal 112 is mounted within the bore portion 111.

Received within the chamber thus formed by the cavity portions 107, 108 and 111, is a stepped diameter, clamping piston 113. The larger diameter portion of the piston 113 forms two variable volume chambers 114 and 115 in the cavity portion 108 to which are connected ports 116 and 117, respectively. By alternately introducing air under pressure to one of these ports and exhausting air from the other, the piston 113 may be made to reciprocate.

The clamping piston 113 has a central passage 118 concentric with axis 67. The lefthand end of the passage 118, as seen in FIG. 15, is tapered at 119. The passage 118 and the tapered portion 119 are so sized as to slidably fit over a conventional steel collet 120 having a three segment, tapered clamping end which is slidably engageable with the tapered portion 119 of the sleeve 113. The collet 120 is secured to the clamping block 105 so as to be movable therewith by means of a nut plate 121 into which the collet 120 is threaded. The nut plate 121 is secured to the backing plate 110 by means of threaded fasteners. Movement of the clamping piston 113 toward the left results in engagement of the taper 119 with the annularly arranged, tapered collet segments squeezing the segments inwardly and into gripping engagement with a section of tubing 30 received through the collet 120. Movement of the sleeve 113 toward the right withdraws the camming taper 119 from the tapered end of the collet permitting the resilient collet segments to spring outwardly thereby releasing the grip on the tubing. Thus, by reciprocating the clamping piston 113, tubing within the collet 120 may be correspondingly gripped and released.

For reciprocating the clamping block assembly 105, 110 on the guide rods 106, a double acting, pneumatic power cylinder 122 is secured to the frame members 22 with the piston rod 123 being secured to a weldment 124 secured to the underside of the clamping block 105 by means of threaded fasteners 125. The weldment 124 consists of two spaced plates 126 having a sleeve 127 welded thereto and another plate 128 welded to the front thereof. The plate 128 is drilled to provide a bore in registry with the bore in the sleeve 127, the combination snugly receiving the end of the piston rod 123 which is held therein by means of suitable set screws, one of these being indicated by the numeral 129. Reciprocation of the power cylinder 122 thereby causes reciprocation of the clamping or feeder mechanism 34, 36 on the guide bars 26.

Figure 25:
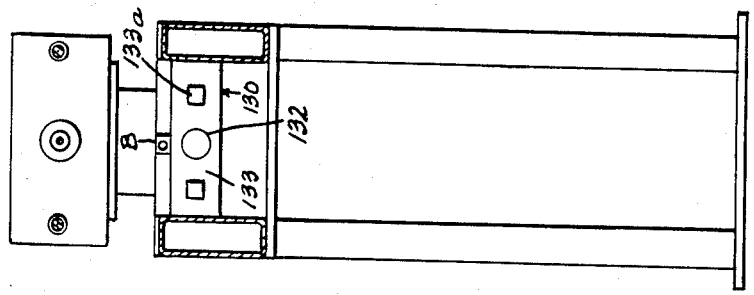
FIG. 25 is a cross section taken substantially along section line 25—25 of FIG. 1.

The length of a reciprocatory stroke of the feeder mechanism 34 is determined by means of forward and rear stop devices indicated generally by the numerals 130 and 131. The forward stop device 130 includes a cross bar secured to the frame members 22 and in line with the forward end of the weldment 124 and rod end 123. This stop device includes a conventional hydraulic shock absorber 132 supported within cross bar 133 secured to frame rails 22, this bar 133 also carrying two urethane plastic cushions or pads 133a engageable by the weldment 124. Since the cylinder 122 is stroked as rapidly as possible, its most forward motion must be cushioned to a stop in order to prevent damage to the equipment and further to reduce noise. Engagement with the sock absorber 132 slows the speed of the piston rod 123 while the urethane cushions provide a positive cushioned stop of the final movement. A proximity switch B (FIGS. 1, 16 and 25) is mounted on bar 133 to sense the forward stop position of the weldment 124, and is connected into the electrical control circuitry to deactuate the respective power cylinder 122 to stop its protractile movement.

The rear stop device 131 is shown in more detail in FIGS. 16 through 19 and generally consists of a block 134 adjustably mounted on the guiderods 26. The edges of the block 134 are provided with two cuts 135 which enter two slide bores forming two clamp portions that fit over the respective guide rods 26, these clamp portions being forced together by means of threaded fasteners 136 for holding the block 134 against movement on the guiderods 26.

The block 134 has two recesses 137 into which are fitted blocks of urethane plastic 138 which serve as impact cushions like the cushions on front stop bumper block 133. Centrally, the block 134 is provided with a clearance passage 139 concentric with axis 67 which receives the tubing 30, the passage 139 being in axial alignment with all of the other clearance passages through the feeder and cutoff mechanisms.

The block 134 is so positioned as to be engaged by the clamping block assembly 105, 110 when it is moved to its most rearward position. The limit of this rearward movement is determined by the position of the clamping block 134 on the guiderods 26, this position also determining the length of tubing which is cut off in each operation of the cutter 32. This will be explained more fully later on.

For absorbing the impact of stopping the feeder mechanism 34 in its rearward movement, a conventional shock absorber 139a is used, this shock absorber being secured to the under surface of the stop block 134 to be engaged by the block assembly 105, 110. A plate member 140 secured to the top side of the block 105 approaches proximity switch C mounted on block 134 an instant before the backing plate 110 of the clamping block assembly engages the block 134. The feeder mechanism 34 is thus cushioned to a full positive stop in both forward and reverse directions. The proximity switch C is connected into electrical circuitry for deactuating the respective power cylinder 122 to stop its retractile movement as the plate member 140 approaches the proximity switch C.

Since adjustment of the stop block 134 on the guiderods 26 determines the length of tubing being cut, a convenient gauge for setting the block 134 on the guiderods 26 is in the form of a pointer 141 attached to the end of the block 134. A suitable scale is provided on one of the frame members 22 opposite the pointer 141 to provide an indication of the setting of the stop block 134 and the consequent length of tubing being cut.

PULL-APART MECHANISM

The pull-apart mechanism is indicated generally by the numeral 142 and is disposed immediately to the left of the cutter 32 as viewed in FIG. 1. This pull-apart mechanism 142 has a gripping block assembly identical to that of the feeder mechanism 34 just described. It is, however, operated by means of a power cylinder 143 of shorter stroke than that of the power cylinder 122. At the time a length of tubing is being cut off by the cutter 32, the pull-apart mechanism 142 has been operated to grip the section 30a of tubing to be cut by actuation of the power cylinder 143 to exert a leftward pull on this section 30a (FIG. 13). Enough force is exerted by the power cylinder 143 such that as the cutting knife 90 nears the end of its stroke, the tubing is literally pulled apart thereby completing the cut, this action having previously been explained. A proximity switch D (FIG. 1) is mounted on a frame support 24 to sense the approach of pull-apart mechanism 142 (moving toward the left) to deactuate power cylinder 143. This determines the extent of leftward movement of mechanism 142. Switch D is connected into the circuitry of the machine as explained later.

MECHANISM FOR STRAIGHTENING THE TUBING

The mechanism for straightening the tubing is shown in FIGS. 1 and 2 as comprising a series of freely rotatable idler rollers having grooved peripheries which are aligned with the tubing axis 67 of the machine. The rollers are in two groups 144 and 145, the first being rotatable about horizontal axes and the second on vertical axes. The rollers of each group are offset with respect to each other as shown such that tubing fitting into the grooved peripheries and fed therethrough in the direction of the arrow F (FIG. 1) will be straightened by the time it emerges at the output side thereof indicated by the numeral 146. Thus, the machine of this invention is capable of both straightening crooked tubing and cutting it to length simultaneously.

Proximity switches E and F (FIG. 1) are mounted on the machine frame adjacent the path of tubing 30 to sense that tubing in fact is in the machine. These switches E and F are so connected into the control circuitry as to enable the circuitry for automatic operation of the machine. With no tubing in the machine, the circuitry is disabled.

OPERATION

In operation, tubing is threaded through the roller groups 144, 145, the supports 24, the rear stop devices 131, the feeder assemblies 34 and 36, the cutting mechanism 32 and the pull-apart mechanism 142. The rear stop devices 131 for the two feeder mechanisms 34 and 36 are equally adjusted on the guiderods 26 so as to set the reciprocatory strokes of the two feeder mechanisms 34 and 36 to be of the same length. Assuming that a cut has just been completed, only one of the feeder mechanisms grips tubing 30, now the power cylinder 48 is first actuated to retract the cutter slide 83 as well as the roller backup slides 84 and 85. Next the collet in the pull-apart mechanism 142 releases its grip on the section 30a of the tubing that has just been cut. The collet of the feeder mechanism 34 that is closed onto tubing 30 (assuming the collet in mechanism 36 is released) as yet is not released. The pull-apart cylinder 143 having retracted to the left to pull the cut section 30a away from the cutter 32 is now protracted to the right to move the pull-apart collet into its ready-to-cut position. Still the collet 120 of the feeder mechanism 34 remains gripped onto tubing 30. At this time the collet 120 on the other feeder mechanism 36 which is fully retracted against its stop device 131, closes and grips the tubing 30. The collet 120 on the first feeder mechanism 34 opens at this time. The feeder mechanism 36 now moves forwardly against its positive stop 130 thereby feeding a predetermined length of tubing through the cutting and pull-apart mechanisms 32 and 142. This length corresponds to the distance between the forward and rear stop devices 130 and 131. The pull-apart mechanism 142 grips tubing section 30a and starts pulling by virtue of actuation of cylinder 143, and with the feeder mechanism 36 still gripping the tubing, the power cylinder 48 is now actuated causing the cutting and back up assemblies 83, 84 and 85 to move radially inwardly to cut off the tube.

While the feeder mechanism 36 was moving forwardly, the other feeder mechanism 34 was being cycled in reverse by its cylinder 122 to a position against its reverse stop device 131. As soon as the cutting mechanism 32 has completed a cut and the cutter slides 83, 84 and 85 have retracted, the feeder mechanism 34 in its reversed or feeding-start position is immediately ready to grip and project the tubing forwardly through the cutting mechanism 32. Thus, while one feeder mechanism 34, 36 is moving forwardly, the other is moving rearwardly thereby saving machine time in feeding tubing to the cutting mechanism 32.

In some instances, the wall thickness of the tubing is so great that more pulling force on the tubing is required than is available in one feeder mechanism 34, 36 alone. In this instance, these mechanisms are caused to reciprocate in unison, both gripping the tubing simultaneously and forcing it through to the cutting mechanism 32. Such tubing is straightened by the roller groups 144 and 145 as it is being drawn through.

In the event lengths of tubing are to be cut which are longer than the distance between the forward and reverse stops 130 and 131, it will be necessary to cycle the feeder mechanisms 34 and 36 two or more times until the required tubing length has been fed through. Adjustment of the feeder mechanisms is made as follows. Assuming that a length of tubing 80 inches long is to be cut, the distance between the respective pairs of forward and reverse stops 130 and 131 is set to be 20 inches. The feeder mechanisms are then caused to cycle four times in order to obtain the 80 inches of feed, before the cutting mechanism 32 is cycled. Thus, it is seen that lengths of tubing of various size may be cut by correspondingly adjusting the apparatus, in a reliable and rapid manner.

Figure 26A:
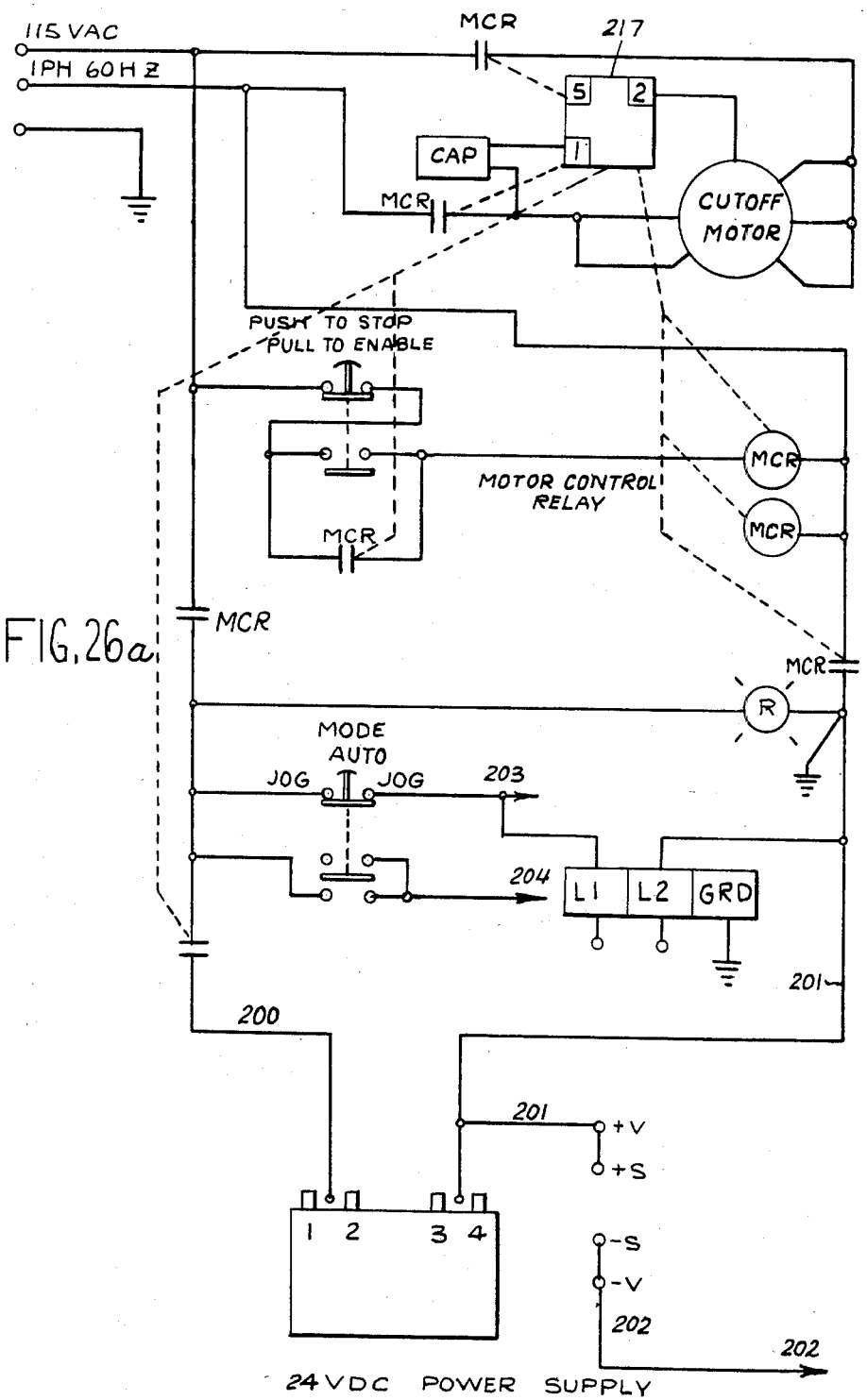
FIGS. 26a and 26b together is an electrical circuit diagram used in controlling the operation of the machine automatically.
Figure 26B:
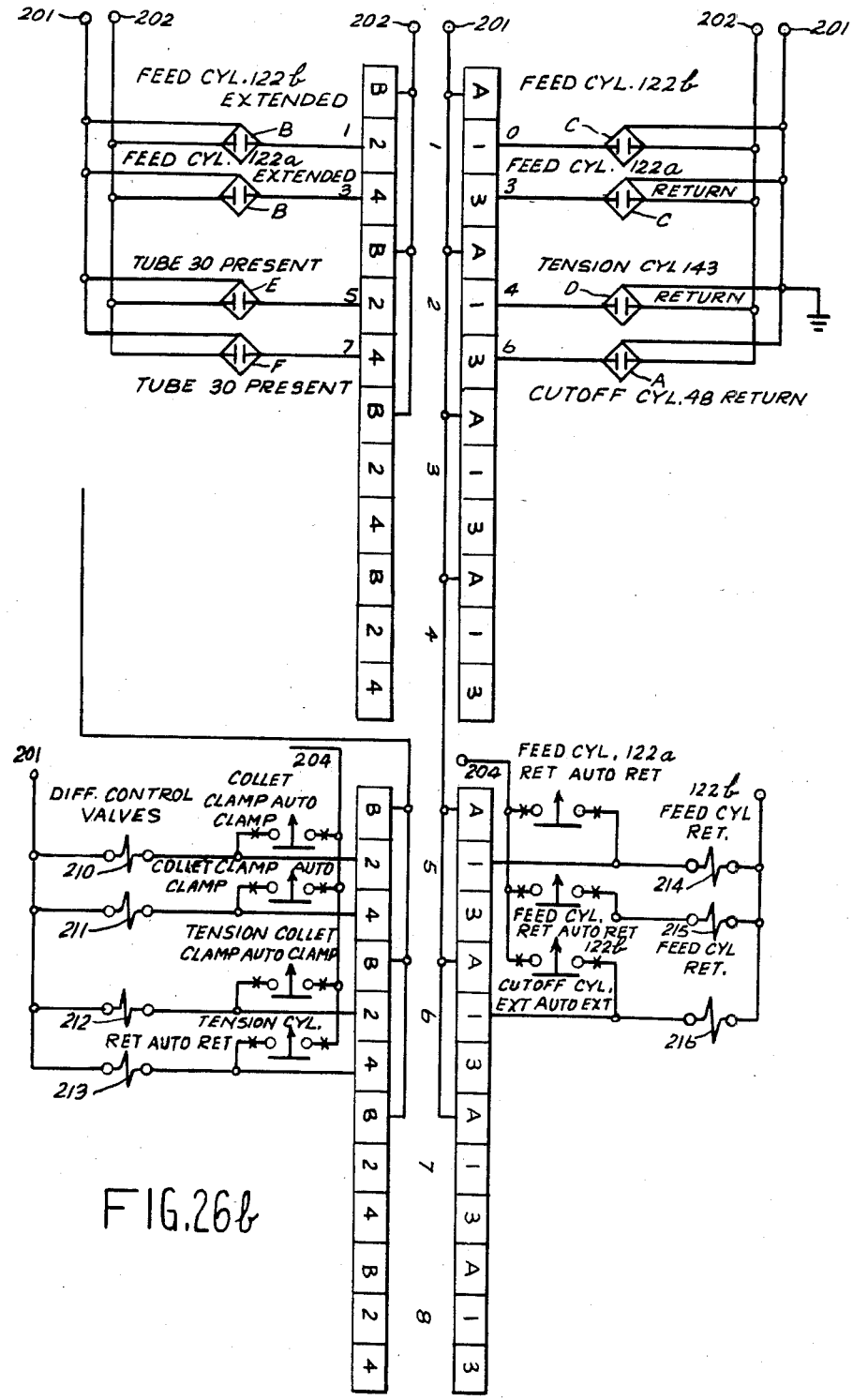
Figure 27:
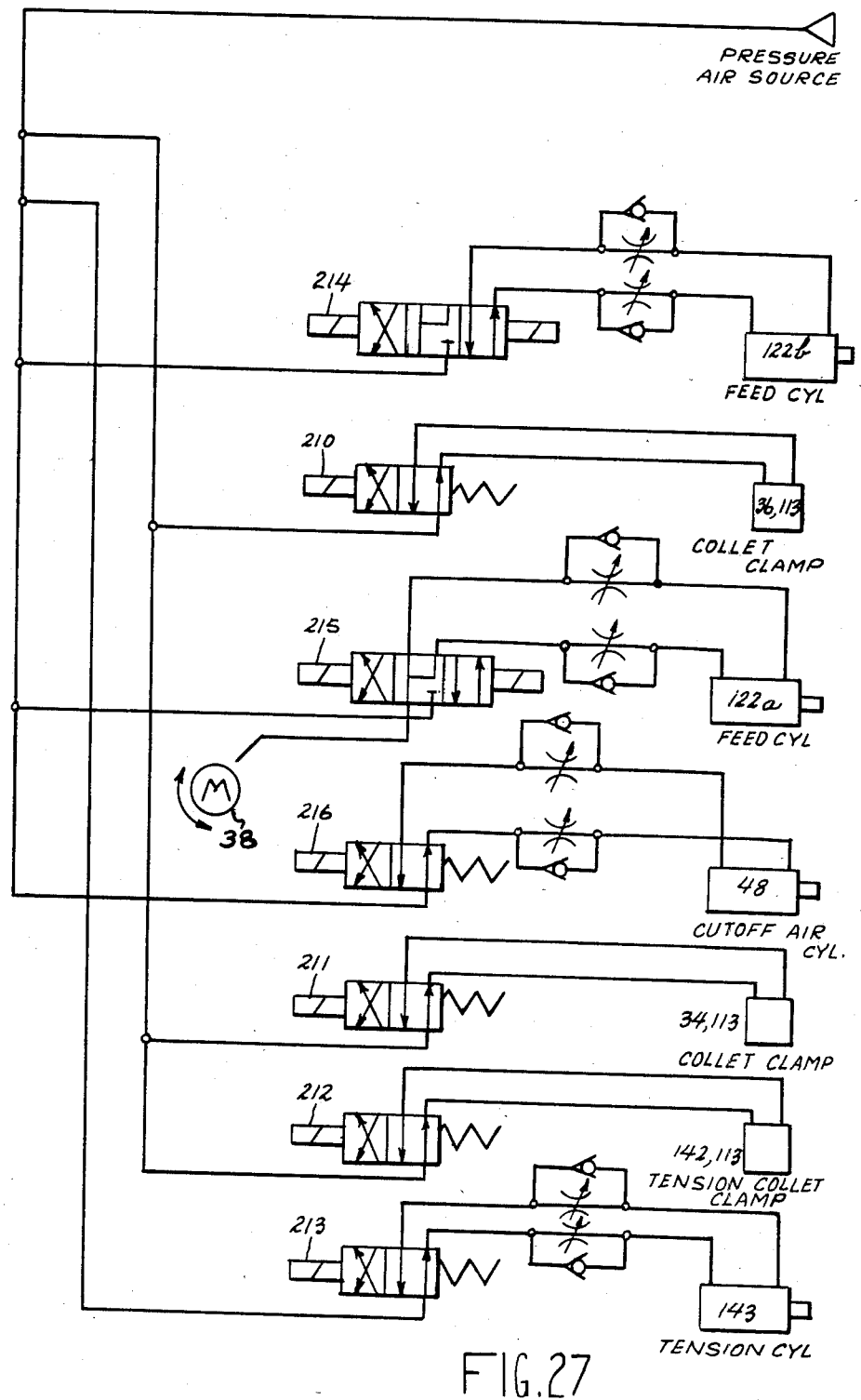
FIG. 27 is a schematic diagram of the air pressure system for operating the machine.

The circuit diagram of the electrical and pneumatic control systems are shown in FIGS. 26a, 26b and 27. When 115 volts A.C. is applied to the circuitry, the cut-off motor 38 is energized and operates continuously. The motor control relay 217 is energized upon application of this voltage and closes the various contacts labeled "MCR". A programmable controller is also connected to this source of voltage at terminal points labeled L1 and L2, such a controller being Model No. IPC-90 as manufactured by Industrial Solid State Controls of York, Pa., and may be programmed to obtain the desired machine operation automatically. FIG. 26b shows the connections to the controller and the various other components of the total system, these including the proximity switches A through F and spring return differential control valves 210 through 216 shown in FIG. 27 which control the operation of the various air cylinders and collet clamps as shown.

While the machine may be operated manually in accordance with the explanation given hereinabove, it may also be operated automatically using the electrical and air systems just described.

While there have been described above the principles of this invention in connection with specific apparatus, it is to be clearly understood that this description is made only by way of example and not as a limitation to the scope of the invention.

What is claimed is:

1. Apparatus for cutting metallic tubing into predetermined lengths comprising a stationary supporting frame, means on said frame for moving a straight length of tubing unidirectionally intermittently along a straight path in alignment with the longitudinal axis of said tubing means for cutting off said tubing while it is stationary between movements; said moving means including two spaced feeder mechanisms mounted for reprocable movement on said frame, means for reciprocating simultaneously said feeder mechanisms in opposite directions between predetermined limits, said feeder mechanism including means for gripping said tubing during movement of the feeder mechanism in a forward direction and releasing said tubing during movement in the reverse direction; each said feeder mechanism and the gripping means thereof comprising a hollow gripping collet having resilient annularly arranged clamping segments radially movable inwardly to grip tubing received thereby, a clamping sleeve surrounding said collet and movable axially with respect thereto, said sleeve and collet segments having camming means thereon which force said segments inwardly in response to relative movement of said sleeve and collet in one direction and releases said segments for relative movement in the opposite direction, a clamping block operatively carried by said frame for reciprocating movement, said collet being affixed to said clamping block, said clamping block having a cylinder cavity therein which receives said sleeve for reciprocation, said sleeve being in the form of a piston and defining two opposed variable volume chambers within said cylinder cavity adapted to be connected alternatively to fluid under pressure and exhaust for alternately operating and releasing said collet segments, said reciprocating means including two double acting power cylinders, one for each feeder mechanism, mounted on said frame and each having a piston rod connected to each said clamping block, and a control system for operating said power cylinder and the clamping sleeves of said feeder mechanisms oppositely such that while one feeder mechanism is moving in said forward direction it has its collet clamped onto said tubing while the other feeder mechanism is moving in the reverse direction and has its collet released.

2. The apparatus of claim 1 wherein said camming means includes a tapered outer surface on the clamping segments of said collet, an oppositely tapered inner surface on said sleeve slidably engageable with said outer surface thereby to operate said segments upon reciprocatory movement of said sleeve.

3. The apparatus of claim 2 wherein said sleeve is generally cylindrical with reduced diameter portions on opposite ends thereof thereby defining a piston portion between said end portions, said cylinder cavity having opposed bore portions which slidably receive said end portions, respectively, and a central portion which slidably receives said piston portion, said piston portion defining with opposite ends of said central portion said variable volume chambers.

4. The apparatus of claim 1 wherein said frame includes two spaced parallel guide bars on which said clamping block is mounted for reciprocation, two reverse stop devices fixedly mounted on said guide bars in position for engagement by said feeder mechanisms, respectively, said devices determining the limit of movement of said feeder mechanisms in said reverse direction.

5. The apparatus of claim 4 wherein said devices are adjustably mounted on said guide bars, and two forward stop devices on said frame operatively engageable by said feeder mechanisms, respectively, at the ends of the strokes thereof in said forward direction, whereby adjustment of said reverse stop devices determines the length of stroke of said feeder mechanisms.

6. The apparatus of claim 5 wherein said stop devices include shock-absorbers for cushioning the forward and reverse stopping of said feeder mechanisms.

7. Mechanism for feeding predetermined lengths of tubing intermittently in a given direction and pausing after each such predetermined length is fed for severing a tubing segment of the predetermined feed length from remaining tubing comprising a stationary supporting frame, first and second spaced apart clamping devices carried by said frame for simultaneous reciprocatory movement in opposite directions, each said clamping device having a passage therethrough for receiving a length of tubing, said passage being defined by a tubing gripper having resilient gripping portions movable radially inwardly of said passage, each said clamping device further including: an actuator carried by said clamping device and having a bore therethrough which receives said gripper, said actuator being movable relative to said gripper, said actuator and gripper having engageable camming means for moving said gripping portions radially inwardly for one direction of relative movement for said actuator and for releasing said gripping portions for the opposite direction of such relative movement, means for reciprocating said clamping device, and means for controlling the movement of said actuator to cam said gripping portions inwardly while said clamping device is moving forwardly and to release said gripping portions when said clamping device is moving rearwardly, said actuator being piston mounted for reciprocation within a cylinder cavity in said clamping device, said gripper and said cylinder cavity being fixed against relative movement whereby only the movement of said piston within said cavity serves to actuate said gripper; and control means for coordinating reciprocatory movement of the first and second clamping devices so that when one clamping device is moved forwardly and gripping the tubing, the other clamping device is moving rearwardly.

8. The mechanism of claim 7 wherein said gripper is a collet and said piston is hollow and surrounds said collet.

9. The mechanism of claim 8 wherein said camming means includes a first annular camming surface which surrounds said gripping portions and a second annular camming surface on the interior of said hollow piston, said first camming surface being tapered outwardly in said one direction of relative movement of said piston.

10. The mechanism of claim 9 including two spaced stop devices on said frame on opposite sides of said clamping device, said clamping device being movable between and operatively engageable with said stop devices, respectively, to control the length of stroke of said clamping device, one of said stop devices being mounted on said frame for spacing adjustment with respect to the other stop device, and said reciprocating means including a double acting power cylinder on said frame.

* * * * *